(12) United States Patent
Hofhansl et al.

(10) Patent No.: US 11,378,136 B2
(45) Date of Patent: Jul. 5, 2022

(54) CORD PACKAGE SUPPORTING DEVICE, ELASTIC JOINT DISK AND METHOD FOR PRODUCING AN ELASTIC JOINT DISK

(71) Applicant: VIBRACOUSTIC GMBH, Darmstadt (DE)

(72) Inventors: Frank Hofhansl, Auggen (DE); Niklas Müller, Ihringen (DE)

(73) Assignee: Vibracoustic SE, Darmstadt (DE)

( * ) Notice: Subject to any disclaimer, the term of this patent is extended or adjusted under 35 U.S.C. 154(b) by 402 days.

(21) Appl. No.: 16/344,073

(22) PCT Filed: Oct. 9, 2017

(86) PCT No.: PCT/EP2017/075708
§ 371 (c)(1),
(2) Date: Apr. 23, 2019

(87) PCT Pub. No.: WO2018/077606
PCT Pub. Date: May 3, 2018

(65) Prior Publication Data
US 2019/0257364 A1 Aug. 22, 2019

(30) Foreign Application Priority Data
Oct. 24, 2016 (DE) .................. 10 2016 120 252.5

(51) Int. Cl.
*F16D 3/60* (2006.01)
*F16D 3/78* (2006.01)
(52) U.S. Cl.
CPC .............. *F16D 3/60* (2013.01); *F16D 3/78* (2013.01); *Y10S 59/90* (2013.01); *Y10T 29/49833* (2015.01); *Y10T 29/49885* (2015.01)

(58) Field of Classification Search
CPC ..... F16D 3/60; F16D 3/78; F16D 3/62; Y10T 29/49833; Y10T 29/49885
(Continued)

(56) References Cited

U.S. PATENT DOCUMENTS 1,712,730 A * 5/1929 Goble .................. F04B 53/00
59/78
2,192,946 A * 3/1940 Towner ................ F42B 39/005
59/900

(Continued)

FOREIGN PATENT DOCUMENTS

| CN | 1617985 A | 5/2005 |
| CN | 102159840 A | 8/2011 |

(Continued)

OTHER PUBLICATIONS

Chinese Search Report, 2017800655838, dated Dec. 21, 2020.
(Continued)

*Primary Examiner* — Greg Binda
(74) *Attorney, Agent, or Firm* — Fishman Stewart PLLC

(57) ABSTRACT

A cord package supporting device for supporting a cord package wound with a cord, such as for an elastic joint disk for connecting two shaft portions, is disclosed. The cord package includes two opposite arcuate cord regions and two tangential cord regions that connect the arcuate cord regions to each other and extend parallel to each other. In embodiments, the cord package supporting device includes a first redirecting portion and a second redirecting portion, about which in each case one arcuate cord region of the cord package is guided. In embodiments, the two redirecting portions are integrally connected to each other via a web. An elastic joint disk and a method for producing an elastic joint disk are also disclosed.

16 Claims, 3 Drawing Sheets

(58) Field of Classification Search
USPC .......................... 464/69; 59/84, 90, 78, 900
See application file for complete search history.

(56) References Cited

U.S. PATENT DOCUMENTS

| | | | |
|---|---|---|---|
| 4,118,952 | A | 10/1978 | Kobayashi |
| 7,250,002 | B2 | 7/2007 | Kotsusa |
| 8,460,113 | B2 | 6/2013 | Waehling et al. |
| 2008/0220885 | A1 | 9/2008 | Muchingile |
| 2013/0143677 | A1 | 6/2013 | Memel et al. |

FOREIGN PATENT DOCUMENTS

| | | | |
|---|---|---|---|
| CN | 104912954 A | | 9/2015 |
| DE | 19720857 A1 | | 11/1998 |
| DE | 102005031641 B3 | | 9/2006 |
| DE | 102008047596 A1 | | 3/2010 |
| DE | 202011108594 U1 | | 1/2012 |
| DE | 102011121472 A1 | | 6/2013 |
| DE | 102012001139 A1 | | 7/2013 |
| DE | 102016120252 A1 | | 4/2018 |
| EP | 2623812 A2 | | 8/2013 |
| FR | 2313595 A1 | | 12/1976 |
| JP | 3-239817 A | * | 10/1991 ............. 464/69 |
| JP | 2006-029450 A | | 2/2006 |
| WO | 2005/059391 A1 | | 6/2005 |

OTHER PUBLICATIONS

International Search Report, PCT/EP2017/075708, dated Jan. 12, 2018.
Chinese Search Report, 2017800655838, dated May 24, 2021.
Machine Translation of Chinese Office Action, 201780065583.8, dated May 28, 2021.
Chinese Office Action, 201780065583.8, dated May 28, 2021.
Translation of Korean Notice of Preliminary Rejection, 10-2019-7011744, dated Feb. 7, 2022.

* cited by examiner

CORD PACKAGE SUPPORTING DEVICE, ELASTIC JOINT DISK AND METHOD FOR PRODUCING AN ELASTIC JOINT DISK

CROSS-REFERENCE TO RELATED APPLICATIONS

This application is a National Stage Patent Application of International Patent Application No. PCT/EP2017/075708, filed Oct. 9, 2017, which claims the benefit of German Application Serial No. 10 2016 120 252.5, filed Oct. 24, 2016, the contents of each are incorporated by reference in their entireties.

TECHNICAL FIELD

The present invention relates to a cord package supporting device for supporting a cord package wound with a cord for an elastic joint disk for connecting two shaft portions, wherein the cord package has two opposite arcuate cord regions and two tangential cord regions that connect the arcuate cord regions to each other and extend parallel to each other. The invention further relates to an elastic joint disk for connecting two shaft portions and to a method for producing an elastic joint disk for connecting two shaft portions.

BACKGROUND

An elastic joint disk of the type mentioned in the introduction, which may also be referred to as an elastic torsion coupling, NRG-Disc® or Hardy disk, is used for connecting two shaft portions of a joint shaft, particularly a cardan shaft. The joint disk compensates slight displacements of the two shafts and at the same time dampens torque impulses resulting from a rotational speed change of a joint shaft or the start-up of the joint shaft.

A conventional elastic joint disk includes a plurality of bushings, loop or cord packages and an elastomer body, into which the bushings and cord packages are at least partially embedded. The joint disk is fastened to the shaft portions of the joint shaft via the bushings.

For producing a joint disk, two bushings are positioned adjacent to each other and a cord is wrapped around them. The cord packages formed in the process, together with the bushings, may then either be embedded as a whole into an elastic body, or each of the cord packages including the bushing is encased by an elastic body, and then the encased cord packages are connected to each other.

For example, DE 10 2008 047 596 A1 discloses an elastic joint disk comprising a plurality of bushings, a plurality of loop packages, wherein each loop package wraps around two adjacent bushings in each case, and each bushing is wrapped by at least two loop packages, a supporting device arranged for axially guiding the plurality of the loop packages on the bushings, and a rubber-elastic encasement into which the loop packages, the supporting devices and the bushings are at least partially embedded.

Furthermore, an elastic joint disk is apparent from DE 10 2011 121 472 A1, which is formed from a plurality of inlays, wherein each inlay comprises at least two tubular bushings, at least one oval-shaped cord package wrapped around the bushings, and at least one elastomer body into which the inlay is embedded. The inlays are then connected to form a joint disk.

SUMMARY

The present invention is based on the object of providing a cord package supporting device, an elastic joint disk and a method for producing an elastic joint disk that enable a simpler and thus less expensive production and a continuous stabilization of the cords.

A cord package supporting device with the features as claimed, an elastic joint disk with the features as claimed, and a method for producing an elastic joint disk with the features as claimed are proposed for achieving the object.

Advantageous embodiments of the cord package supporting device and of the method for producing an elastic joint disk are the subject matter of the respective dependent claims.

According to one aspect, a cord package supporting device is proposed, for supporting a cord package wound with a cord for an elastic joint disk for connecting two shaft portions, wherein the cord package has two opposite arcuate cord regions and two tangential cord regions that connect the arcuate cord regions to each other and extend parallel to each other. The cord package supporting device has a first redirecting portion and a second redirecting portion, about which in each case one arcuate cord region of the cord package is guided, wherein the two redirecting portions are integrally connected to each other via a web.

Due to the integral or one-piece design, the cord package supporting device is dimensionally stable. As a result, the cord always remains pre-tensioned when it is wound onto the cord package supporting device. Thus, a constant tensioning and relaxing the cord or the cord package can be omitted in further process steps. The one-piece design makes winding directly onto the cord package supporting device possible. In addition, feeding the cord package supporting device into a winding machine is facilitated by the integral design. Consequently, the effort for adjusting and monitoring the winding machine is reduced so that the complexity of production is simplified. Furthermore, the integral configuration of the cord package supporting device enables the use of simple, and thus inexpensive, retaining devices and tools during the process chain, so that the investment in machinery and the article-specific costs are reduced. As a result, an economical production is possible already at small quantities.

In an advantageous embodiment, the web can be detached from the redirecting portions. By detaching the web, the two redirecting portions are able to move relative to one another in order to make the elasticity required for vibration isolation and acoustic decoupling of the two shaft portions possible. In particular, the web is detached from the redirecting portions when the cord package is fully wound onto the cord package supporting device, or when the wound cord package is partially encased by an elastomer body.

Each of the redirecting portions may have at least one depositing region for depositing the cord supporting device for detaching the web. The depositing region ensures that the web can be punched out in a procedurally reliable manner.

In an advantageous embodiment, each of the redirecting portions has two opposite collar portions that accommodate the cord package between them and axially support it. The collar portions prevent the cord package from slipping off the cord package supporting device before the latter is provided with an elastic encasement. In addition, the collar portions ensure that the cord package is supported in the case of great stresses during operation.

In an advantageous embodiment, a distance between the opposite collar portions in the region of a tangential cord guidance increases steadily. Advantageously, a distance between the opposite collar portions in the tangential cord guiding regions increases steadily. As a result, the cord package is able to realize large articulation angles. In particular, the collar portions have a funnel-shaped opening angle in the tangential cord guiding regions. Advantageously, the distance between the opposing collar portions in the arcuate cord guiding regions is constant. As a result, the cord package has a parallel cord guidance in its arcuate cord regions, whereby the free cord length is increased.

In an advantageous embodiment, each redirecting portion has an arcuate cord guiding region around which an arcuate cord region is guided, and two tangential cord guiding regions, wherein a portion of a tangential cord region leads to each of the tangential cord guiding regions.

Each of the redirecting portions may have a through-hole for pressing in a bushing and a ridge portion for fastening the web. The web is connected integrally and with material uniformity to the ridge portions. In particular, the web has a smaller vertical extent than the two ridge portions. Thus, the web is easy to detach from the two ridge portions. Furthermore, the two ridge portions serve as stops when the web has been detached. Thus, the ridge portions serve as an integrated overload protection means in the case of large deflections. The deflection can be adjusted by the shaping of the ridge portions. Advantageously, the ridge portions have a large contact surface. Each of the ridge portions may have a depositing region for depositing the cord package supporting device for detaching the web.

The cord package supporting device may have an elastomer body which partially encases the cord package supporting device. Since the cord package supporting device has an integral or one-piece configuration, a small quantity of elastomer is required for encasement. Furthermore, the number of the cavities in the injection mold may be increased because an improved exploitation of the injection mold surface is made possible by the integral design. Due to the smaller quantity of elastomer, the buoyancy surface in the injection mold is reduced and, associated therewith, the buoyancy force. In addition, no functionally irrelevant elastomer is present so that the heating time can be shortened.

In an advantageous embodiment, the redirecting portions and the web are produced integrally by injection molding. This makes a simple and cost-effective production of the cord package supporting device possible.

The two redirecting portions and the web may be produced from a plastic, particularly a fiber reinforced plastic. As a result, the cord package supporting device has a low weight. According to another aspect, an elastic joint disk for connecting two shaft portions is proposed. The joint disk comprises a plurality of cord package supporting devices, a plurality of cord packages and a plurality of bushings, wherein one cord package in each case is wrapped around a cord package supporting device, wherein each cord package supporting device wrapped with a cord package is encased by an elastomer body at least in some portions, and wherein one bushing in each case connects two cord package supporting devices to each other. Due to the integral design, the cord package supporting device is dimensionally stable. As a result, the cord always remains pre-tensioned when it is wound onto the cord package supporting device. Thus, a constant tensioning and relaxing the cord or the cord package during the respective process steps can be omitted. Furthermore, winding directly onto the cord package supporting device is possible. In addition, feeding the cord package supporting device onto a winding machine is facilitated. Accordingly, the effort for adjusting and monitoring the winding machine is reduced so that the complexity of production is simplified. Furthermore, the integral configuration of the cord package supporting device enables the use of simple, and thus less expensive, retaining devices and tools during the process steps. This results in a reduced investment in machinery and thus in lower article-specific costs. As a result, an economical production is possible already at small quantities. In addition, only a small quantity of elastomer is required for encasement. Furthermore, the number of the cavities in the injection mold may be increased because an improved exploitation of the injection mold surface is made possible by the integral design. Due to the smaller quantity of elastomer, the buoyancy surface in the injection mold is reduced and, associated therewith, the buoyancy force. In addition, no functionally irrelevant elastomer is present so that the heating time can be shortened.

According to another aspect, a method for producing an elastic joint disk for connecting two shaft portions is proposed, which comprises the following method steps. First, a plurality of cord package supporting devices is provided, wherein each cord package supporting device comprises two redirecting portions and a web integrally connecting the two redirecting portions to each other, and wherein each redirecting portion has a through-hole for pressing in a bushing. Subsequently, a cord is wound around each of the cord package supporting devices in order to produce a cord package on each of the cord package supporting devices. Then, each of the cord package supporting devices is partially encased with an elastomer body. Finally, the cord package supporting devices, which are partially encased with an elastomer body, are connected to each other by means of a plurality of bushings to form a joint disk, by one bushing in each case being pressed into the through-holes of two cord package supporting devices.

According to another aspect, a method for producing an elastic joint disk for connecting two shaft portions is proposed, which comprises the following method steps. First, a plurality of cord package supporting devices is provided, wherein each cord package supporting device comprises two redirecting portions and a web integrally connecting the two redirecting portions to each other, and wherein each redirecting portion has a through-hole for pressing in a bushing. Subsequently, a cord is wound around each of the cord package supporting devices in order to produce a cord package on each of the cord package supporting devices. Then, the cord package supporting devices are connected to each other by means of a plurality of bushings to form a joint disk basic body, by one bushing in each case being pressed into the through-holes of two cord package supporting devices. Finally, each of the cord package supporting devices is partially encased with an elastomer body.

In an advantageous embodiment, the web is detached from the redirecting portions after each of the cord package supporting devices has been partially encased with an elastomer body.

In an advantageous embodiment, the cord package supporting devices are coated prior to a cord being wound around each of the cord package supporting devices.

BRIEF DESCRIPTION OF THE DRAWINGS

The cord package supporting device, the joint disk, the methods for producing a joint disk and further features and advantages are explained in more detail with reference to an exemplary embodiment, which is schematically shown in the Figures. In the Figures.

DETAILED DESCRIPTION

Figure 1:
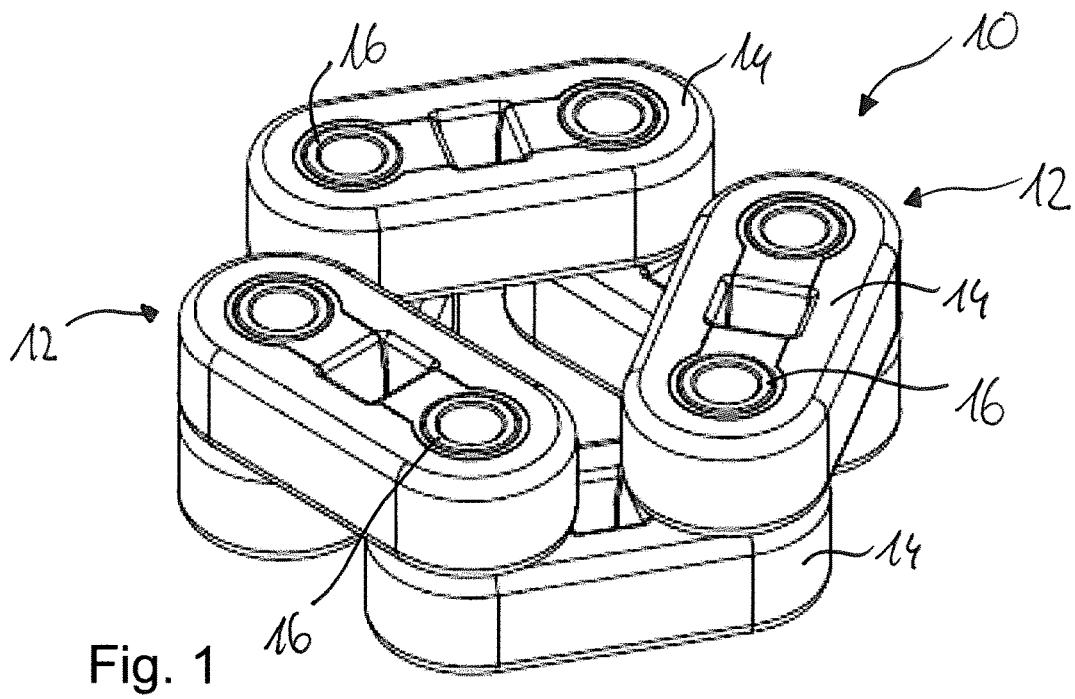
FIG. 1 shows a perspective view of an elastic joint disk.

An elastic joint disk 10, which serves for connecting two shaft portions of a joint shaft of a motor vehicle that are not shown, is shown in FIG. 1.

The joint disk 10 includes a plurality of cord package supporting devices 12 partially encased by an elastomer body 14 and a plurality of bushings 16 which in each case connect two cord package supporting devices 12 to each other.

Figure 2:
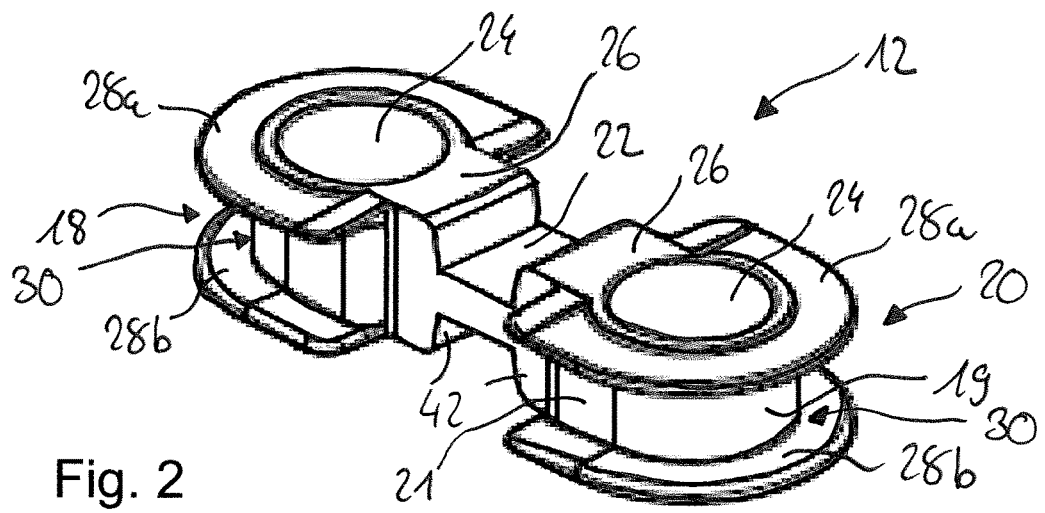
FIG. 2 shows a perspective view of a cord package supporting device.
Figure 3:
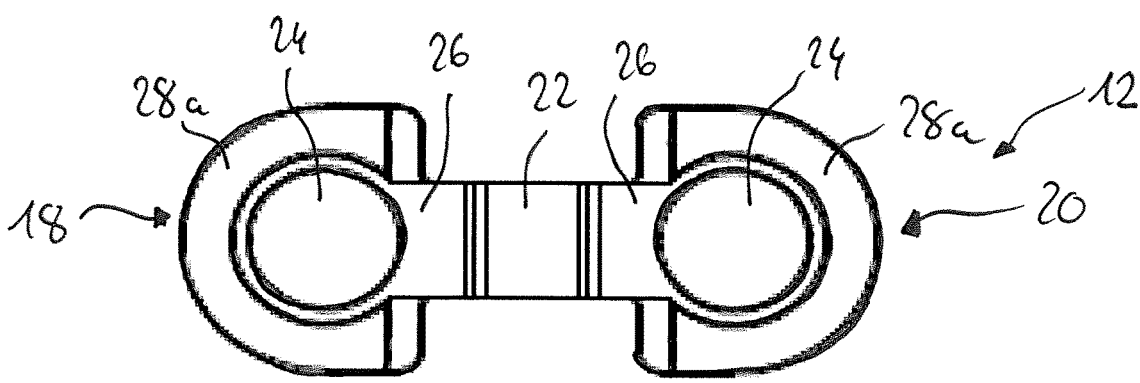
FIG. 3 shows a top view of the cord package supporting device shown in FIG. 2.
Figure 4:
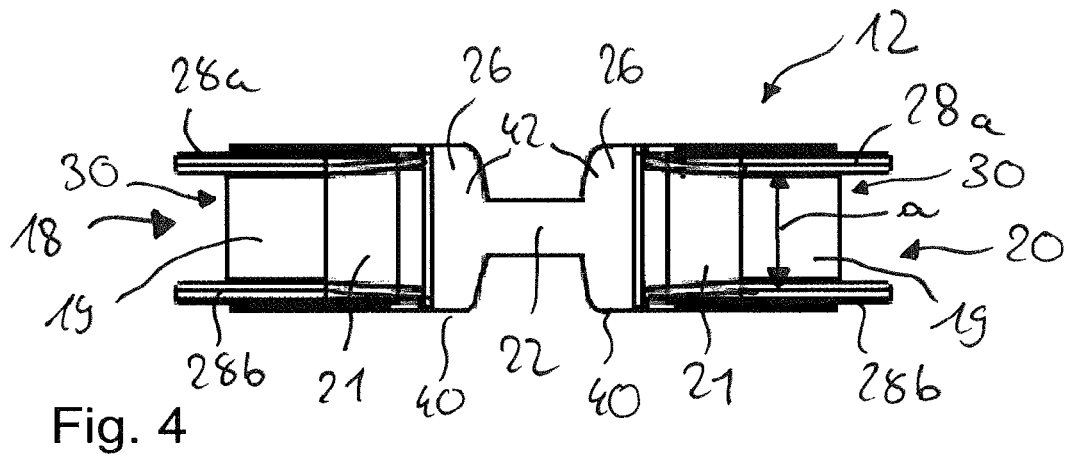
FIG. 4 shows a side view of the cord package supporting device shown in FIG. 2.

As is apparent from the FIGS. 2 to 4, the cord package supporting device 12 has a first redirecting portion 18 and a second redirecting portion 20 integrally connected to each other via a web 22. The cord package supporting device 12 is integrally produced from a plastic, particularly a fiber reinforced plastic, by means of the injection-molding method. The label "plastic," as shown in FIG. 5, is included for exemplary purposes only.

Each of the redirecting portions 18, 20 includes an arcuate cord guiding region 19, two tangential cord guiding regions 21, a through-hole 24 for pressing in a portion of a bushing 16, and a ridge portion 26 to which the web 22 is fastened. Furthermore, each of the redirecting portions 18, 20 has two opposing collar portions 28a, 28b that protrude radially outward from the redirecting portions 18, 20 and define a guiding region 30 between them.

Figure 5:
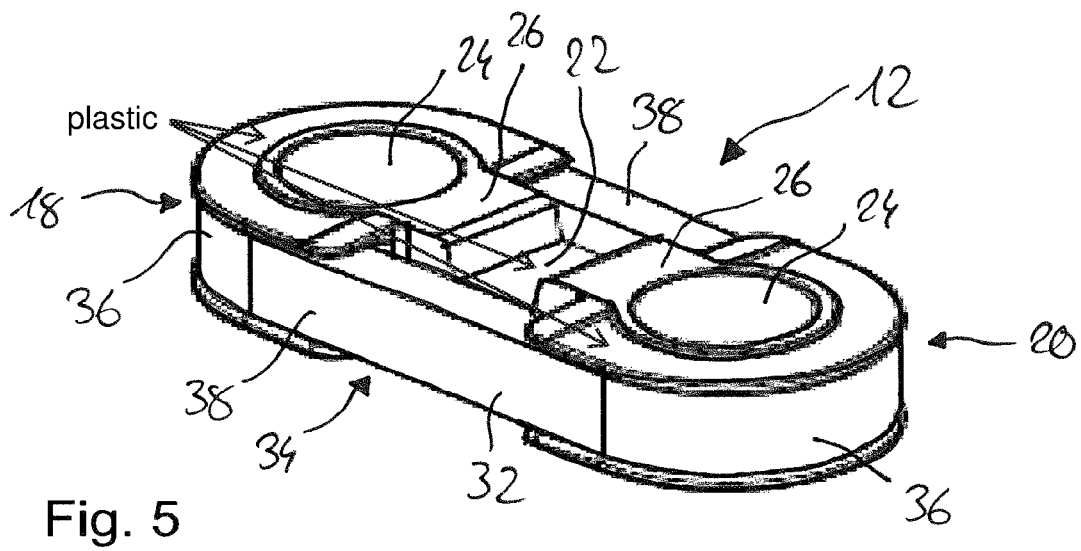
FIG. 5 shows a perspective illustration of the cord package supporting device shown in FIG. 2, with a cord package.

According to FIG. 5, a cord 32 is wound around the cord package supporting device 12 in order to produce a cord package 34, wherein the cord package 34 is guided within the guiding region 30 defined by the collar portions 28a, 28b. The two collar portions 28a, 28b thus prevent the cord package 34 from slipping off the cord package supporting device 12.

The cord package 34 has two opposite arcuate cord regions 36 and two tangential cord regions 38 that connect the arcuate cord regions 36 to each other and extend parallel to each other. In this case, the arcuate cord region 36 is guided around the arcuate cord guiding region 19, and one portion of one of the tangential cord regions 38 in each case abuts against one of the tangential cord guiding regions 21.

As is apparent particularly from the FIGS. 4 and 5, a distance a between the opposite collar portions 28a, 28b in the tangential cord guiding regions 21 increases steadily. In particular, the two collar portions 28a, 28b form a funnel-shaped opening angle for the tangential cord region 38.

In the arcuate cord guiding regions 19, the distance a between the collar portions 28a, 28b is constant. As a result, the free cord length in the arcuate cord region 36 is increased.

Figure 7:
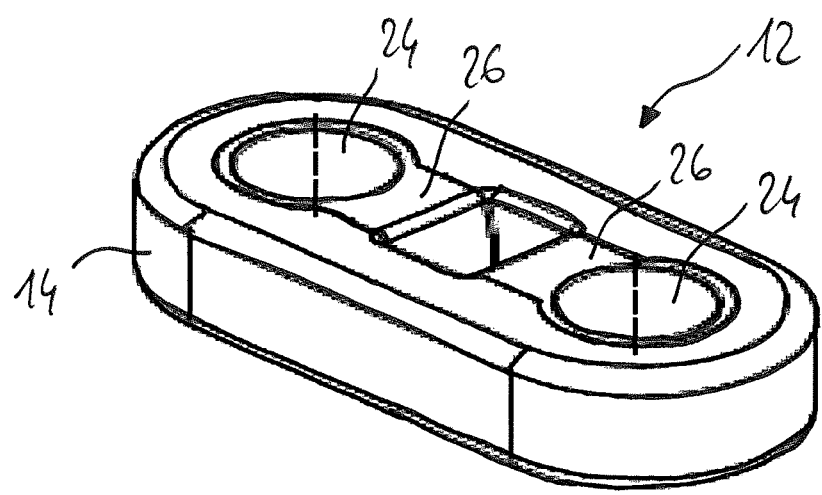
FIG. 7 shows a perspective view of the cord package supporting device shown in FIG. 6, with a detached web.

Compared to the two ridge portions 26, the web 22 has a smaller axial extent and can be detached, in particular punched, from the two ridge portions 26. The detachment or punching of the web 22 takes place when the cord package supporting device 12 is partially encased by the elastomer body 14. A cord package supporting device 12 with a detached web 22 is shown in FIG. 7.

For detaching the web 22, the ridge portions 26 have a depositing region 40 for depositing the cord package supporting device 12. For this purpose, the cord package supporting device 12 is inserted into a punching device, which is not shown, in such a manner that the cord package supporting device 12 is supported on its depositing region 40.

By detaching the web 22, the two redirecting portions 18, 20 can be moved relative to one another. Due to the funnel-shaped opening angles, large articulation angles can be realized, particularly in the area of the tangential cord regions 38. Furthermore, if the web 22 is detached, the ridge portions 26 act as stops 42 in the case of large deflections. The deflection can be adjusted by the shaping of the ridge portions 26.

Figure 6:
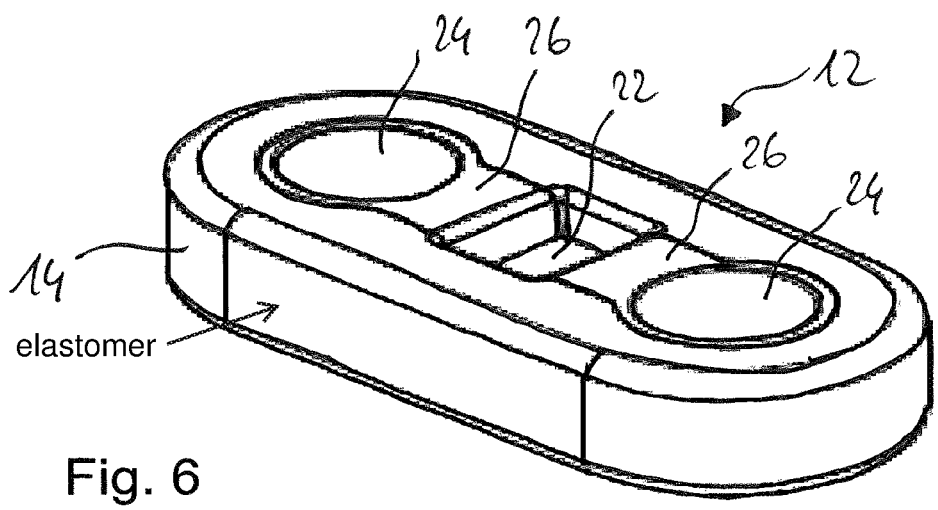
FIG. 6 shows a perspective view of the cord package supporting device shown in FIG. 5, with an elastomer body.

A possible method for producing the joint disk 10 is explained below. First, six cord package supporting devices 12 are provided and pre-treated, in particular coated, for this purpose. Then, each cord package supporting device 12 is separately inserted into a winding machine, which is not shown. Subsequently, a cord 32 is wound around each cord package supporting device 12 in the winding machine in order to produce a cord package 34 as it is shown in FIG. 5. Then, the cord package supporting devices 12, together with the cord package 34, are inserted into a vulcanization mold and partially overmolded with an elastomer material, and then vulcanized in order to produce the elastomer body 14, as this is shown in FIG. 6. The label "elastomer," as shown in FIG. 6, is included for exemplary purposes only. Then, the cord package supporting devices 12 partially encased with the elastomer body 14 are cooled off. Subsequently, the web 22 is detached, in particular punched away. For this purpose, the cord package supporting device 12 is inserted into a punching device, which is not shown, in such a manner that the cord package supporting devices 12 are supported on their depositing regions 40. Then, the cord package supporting devices are positioned in such a way as is shown in FIG. 1, so that the through-holes 24 of two cord package supporting devices 12 lying one on top of the other are aligned. Finally, the bushings 16 are pressed into the through-holes 24 in order to connect the cord package supporting devices 12 to each other to form a joint disk 10.

Moreover, the above-described method for producing the rubber joint disk may also be modified in such a way that the cord package supporting devices 12, around which a cord package 34 is wound, are first connected to each other by means of the bushings 16 to form a joint disk basic body, and then, the joint disk basic body is inserted into a vulcanization mold in order to partially encase the individual cord package supporting devices 12 with the elastomer body 14. Lastly, the webs 22 are then detached, in particular punched away.

The invention claimed is:

1. A cord package, comprising:
   a cord; and
   a cord package supporting device including a first redirecting portion and a second redirecting portion, the first and second redirecting portions are integrally connected via a web, and arcuate cord regions of the cord are guided about the first and second redirecting portions;
   wherein the first and second redirecting portions include two opposite collar portions, and at least a portion of the cord is disposed between the collar portions.

2. The cord package according to claim 1, wherein the web can be detached from the redirecting portions.

3. The cord package according to claim 2, wherein each of the redirecting portions has at least one depositing region for depositing the cord package supporting device for detaching the web.

4. The cord package according to claim 1, wherein the cord package is axially supported by the collar portions of the first and second redirecting portions.

5. The cord package according to claim 4, wherein a distance between the opposite collar portions in the region of a tangential cord guidance increases steadily.

6. The cord package according to claim 1, wherein each redirecting portion has an arcuate cord guiding region around which an arcuate cord region is guided, and two tangential cord guiding regions, wherein each of the tangential cord guiding regions guides a portion of a tangential cord region.

7. The cord package according to claim 1, wherein each of the redirecting portions has a through-hole for pressing in a bushing and a ridge portion for fastening the web.

8. The cord package according to claim 1, wherein an elastomer body partially encases the cord package supporting device.

9. The cord package according to claim 1, wherein the redirecting portions and the web are produced integrally by injection molding.

10. The cord package device claim 1, wherein the two redirecting portions and the web are produced from a plastic.

11. The cord package according claim 10, wherein the plastic comprises fiber reinforced plastic.

12. A method for producing an elastic joint disk for connecting two shaft portions, the method comprising:
   providing a plurality of cord package supporting devices, wherein each cord package supporting device comprises two redirecting portions and a web integrally connecting the two redirecting portions to each other, and wherein each redirecting portion has a through-hole for pressing in a bushing;
   winding a cord around each of the cord package supporting devices to produce a cord package on each of the cord package supporting devices;
   partially encasing each of the cord package supporting devices with an elastomer body; and
   connecting the cord package supporting devices, which are partially encased with an elastomer body, to each other by means of a plurality of bushings to form a joint disk, by one bushing in each case being pressed into the through-holes of two cord package supporting devices.

13. The method according to claim 12, wherein the web is detached from the redirecting portions after each of the cord package supporting devices has been partially encased with an elastomer body.

14. The method according to claim 12, wherein the cord package supporting devices are encased.

15. The method according claim 14, wherein the cord package supporting devices are encased prior to winding the cord.

16. A method for producing an elastic joint disk for connecting two shaft portions, the method comprising:
   providing a plurality of cord package supporting devices, wherein each cord package supporting device comprises two redirecting portions and a web integrally connecting the two redirecting portions to each other, and wherein each redirecting portion has a through-hole for pressing in a bushing;
   winding a cord around each of the cord package supporting devices to produce a cord package on each of the cord package supporting devices;
   connecting the cord package supporting devices to each other by means of a plurality of bushings to form a joint disk basic body, by one bushing in each case being pressed into the through-holes of two cord package supporting devices; and
   partially encasing each of the cord package supporting devices with an elastomer body.

* * * * *